Aug. 6, 1968  B. KIRSCH  3,396,261
ELECTRIC HAND-OPERATED SPOT WELDER
Filed July 21, 1964  9 Sheets-Sheet 3

Inventor:
BERNHARD KIRSCH
BY Robert W. Beach
ATTY.

Aug. 6, 1968   B. KIRSCH   3,396,261
ELECTRIC HAND-OPERATED SPOT WELDER
Filed July 21, 1964   9 Sheets-Sheet 4

Inventor:
BERNHARD KIRSCH
BY Robert W. Beach
ATTY

Aug. 6, 1968    B. KIRSCH    3,396,261
ELECTRIC HAND-OPERATED SPOT WELDER
Filed July 21, 1964    9 Sheets-Sheet 6

Inventor:
BERNHARD KIRSCH
BY Robert W. Beach
ATTY

Aug. 6, 1968  B. KIRSCH  3,396,261
ELECTRIC HAND-OPERATED SPOT WELDER
Filed July 21, 1964  9 Sheets-Sheet 8

Inventor:
BERNHARD KIRSCH
BY Robert W. Beach
ATTY

United States Patent Office 3,396,261
Patented Aug. 6, 1968

3,396,261
ELECTRIC HAND-OPERATED SPOT WELDER
Bernhard Kirsch, Biewerer Strasse 193,
Trier-Biewer, Germany
Filed July 21, 1964, Ser. No. 384,222
Claims priority, application Germany, July 25, 1963,
K 50,349; Mar. 2, 1964, K 52,259
18 Claims. (Cl. 219—90)

ABSTRACT OF THE DISCLOSURE

Of two cooperating welding electrodes, one is fixed relative to a housing and the other is mounted for movement relative to the housing, either by the action of a rack and gear rotating a cam plate engageable with the movable arm, or by a plunger pressing a roller against an inclined surface on the movable arm, or by a fluid-actuated piston and cylinder acting between the movable arm and the housing. One electrode is mounted in a stationary holder and the other electrode is mounted in a holder movable transversely of its length toward the stationary holder, or movable lengthwise toward and away from an electrode carried by the stationary holder. Control switches for welding current are mounted for operation by rotation of the arm-moving cam plate, or by reciprocation of the electrode-moving plunger, or by movement of a number correlated with the electrode-moving piston and cylinder, such as a second piston in a cylinder connected in the same hydraulic circuit with the electrode-moving cylinder. A liquid reservoir and pump for supplying liquid under pressure to the electrode-moving mechanism, a motor to drive the pump, a cooling fan and a transformer for supplying electric welding current are mounted as separate units in the welding apparatus housing for independent insertion in and removal from the housing. Both electrodes can be swung relative to the housing from a central position to one side or the other, or up or down. Electric current can be conducted to the electrodes through arms supporting the electrode-moving cylinder. An electrically-conductive sleeve is located between the cylinder and one arm through which current is conducted to one electrode. The other arm is connected directly to the other electrode holder and an insulating sleeve isolates that electrode holder and arm from the cylinder.

---

The hand-operated spot welders according to known constructions generally consist of two molded parts between which the welding transformer is held, and further of tong arms forming electrode holders one of which is movable and pivotable relative to the other about an axis which is located near the electrodes so that, when the movable tong arm is pivoted relative to the fixed arm, the front end of the movable tong arm and thus also the electrode thereon describes a rather strongly curved arc.

The pressure which is necessary to press the two tong arms with the electrode holders against each other is exerted either by hand via suitable levers of hydraulically or pneumatically, while the motor for operating the spot welder forms an element separate from the housing of the apparatus.

In actual practice it has been found that an arcuate tong movement and an exertion of the necessary force by hand do not permit a steady application of the electrodes upon the workpiece and do not result in accurate welds as required for various purposes. Furthermore, the electrodes burn down unequally and the angle at which they engage with the workpiece varies in accordance with the length to which they are burned.

In those of the known spot welders in which the operating pressure is exerted by hand the danger occurs very easily that the fingers of the operator may be pinched and they also have the disadvantage that, due to the application of manual pressure, the tongs will not be placed with sufficient accuracy upon the point to be welded or that during the compression of the tong arms the point to be welded will be shifted. Furthermore, these known spot welders usually require an additional pressure to be exerted in order to effect a release of the tong arms or to switch off the welding current which usually occurs at the time when the point to be welded is white hot. This also usually results in an undesirable movement of the welded point.

The hydraulic and pneumatic servo arrangements which have so far been employed in apparatus of this type have, on the other hand, the disadvantage that they are relatively complicated and expensive and render the tongs very unhandy. These types of apparatus have the further disadvantage that the pressure impacts are produced by the hydraulic or pneumatic media themselves and are transmitted to the point to be welded.

If the transformer is arranged separate from the tongs and only connected thereto by a cable, a considerable loss of power occurs. Furthermore, the heavy cable is a hindrance and leads to a displacement of the points to be welded.

The known spot-welding tongs have the further disadvantage that it is often very difficult or even impossible to weld around corners or to reach angular positions. It was then necessary to employ a series of apparatus of different shapes for different welds to be made. Apart from the high cost of such a series of apparatus and specially shaped electrodes, the exchange of one apparatus for another or of one electrode for another always involves a costly waste of time and effort.

In many welding operations it becomes necessary to dissipate the heat of welding and to cool the electrodes in order to increase their efficiency and length of service. The spot-welding tongs of a more simple type usually do not permit any cooling since they are either not provided with any connection for compressed air or water or because the necessary hose lines interfere too much with the operation and manipulation of these apparatus.

Still another disadvantage of the known-spot welding tongs consists in the shape of the transformer laminations. Their installation is rather difficult and requires considerable time which especially renders subsequent repairs very expensive.

It is an object of the present invention to provide an electric hand-operated spot welder which overcomes all of the above-mentioned disadvantages of similar apparatus as were previously known. An important feature of the invention is the fact that the transformer cores and the windings thereon and one or several motors for operating the apparatus are arranged like building blocks one behind the other in a common housing from which they may also be removed individually and independently of each other.

This housing of the apparatus preferably consists of insulating material, for example, plastic, although it may also be made of sheet metal in which case insulating elements are provided between the housing and the electrical parts therein so that the exterior of the housing is fully insulated from the parts contained therein.

In order to permit the apparatus to be operated in any position, provided the transmission of forces from the motor to the electrode holders is carried out hydraulically, the same housing which contains the apparatus itself also contains a pump together with a container for the pressure fluid which are likewise removable from the housing independently of each other and of the other parts, and it further contains a spring-loaded piston which always supplies the necessary hydraulic fluid to the intake side of the pump. In place of such a piston it is also possible to provide a bellows-shaped container or the like.

Another object of the invention is to insure that the electrodes will always engage upon a workpiece very accurately in the same position relative to each other. This is attained according to the invention by the provision of suitable means for shifting the movable electrode holder in the operative position so as always to remain parallel to the fixed electrode holder. Another feature of the invention consists in mounting the electrode holders so as to be pivotable relative to the housing of the apparatus. A further preferred feature of the invention consists in the provision of suitable means to permit the movable electrode holder to be moved either in a horizontal or a vertical direction so that welding operations which previously required two different apparatus may now be carried out by a single apparatus.

The driving motor is preferably connected by mechanical, hydraulic, or pneumatic means to at least one cam plate which selectively effects the vertical or horizontal movements of the movable electrode holder and is operatively connected to switch means for switching the welding current on and off. This cam plate may be easily exchanged for another in accordance with the extent of the desired horizontal or vertical movements.

According to one preferred embodiment of the invention, the arms which carry the movable electrode holder are pivotably mounted on a bolt which is located closely adjacent to the end of the housing which is most remote from the electrodes.

It is, however, also possible according to the invention to mount the movable electrode holder on a piston which is movable upwardly and downwardly in a hydraulic cylinder to which the other electrode-holder arm is secured.

The inside of the hydraulic cylinder is preferably provided with gliding elements, for example, balls, to improve the sliding action of the piston in the cylinder and to increase the stability of the entire apparatus. The hydraulic cylinder is further mounted so as to be rotatable relative to the housing to permit it to be turned at an angle of 90°, 180°, or at any desired angle. This permits the apparatus to be adjusted so that the electrode-holder arms will reach difficultly accessible places, especially if in addition these arms are made of an appropriate shape.

Another feature of the invention consists in providing the inlet for the hydraulic fluid and also the lead of the cable for the electric current in a position coinciding with the axis of rotation of the hydraulic cylinder.

The electrode-holder arms themselves are mounted so as to be pivotable about the axis of the hydraulic cylinder. In addition, they are pivotable away from each other and adapted to be locked in the operative position. The invention further provides the electrode-holder arms to be removable from and to be connected to the housing in different positions so as to extend either in the same direction as the movement of the hydraulic piston or vertically thereto.

The means for supplying the welding current to the electrodes preferably consist either of flexible strips or sleeves of a conductive material which surround the hydraulic piston. These contact sleeves may be provided with projections on their outer sides.

For attaining a more effective cooling action, the motor is connected to a ventilator which is likewise mounted in the common housing. This ventilator may be switched on selectively either for the actual welding operation or independently therefrom. The housing of the apparatus is itself designed to form an air channel for conveying the air current from the ventilator past the transformer so as to cool the same and then further up to the electrodes.

The cooling air may, however, also be passed along cooling ribs on the hydraulic cylinder for cooling the hydraulic fluid. It is, however, also possible to employ a cooling fluid which is inserted into a cooling jacket around the cylinder or into cooling conduits in the piston or piston bushing.

It has further been found to be of particular advantage to mount the transformers at the inside of the housing in such a manner that their sets of laminations are not interrupted by bolts or the like as this has previously always been the case. The full cross-sectional area of the sets of laminations is therefore uninterrupted which permits these sets to be made of small dimensions. Furthermore, no magnetic short circuits can then occur at the bolt holes by bolts, pins or the like. The transformer cores may also be exchanged independently of their windings. Each set of laminations preferably consists of two E-shaped half sets which may be fitted over the transformer coil.

In order to permit the spot welder according to the invention also to be employed as a double-point or double-spot welder, two or more windings of the secondary side of the transformer may be connected either in series or in parallel to each other.

It is, however, also possible to mount in the common housing of the apparatus two or more transformers which are provided with irremovable cores and windings and the secondary windings of which are connected in parallel, while their primary windings may be connected to each other whenever desired. The strength of the welding current may be varied by switch elements which are provided between tapping points on the primary winding. It is, however, also possible to vary the strength of the welding current by selectively connecting several transformers to each other.

The aforementioned as well as additional features and advantages of the present invention will become more clearly apparent from the following detailed description thereof which is to be read with reference to the accompanying drawings, in which—

Figure 1:
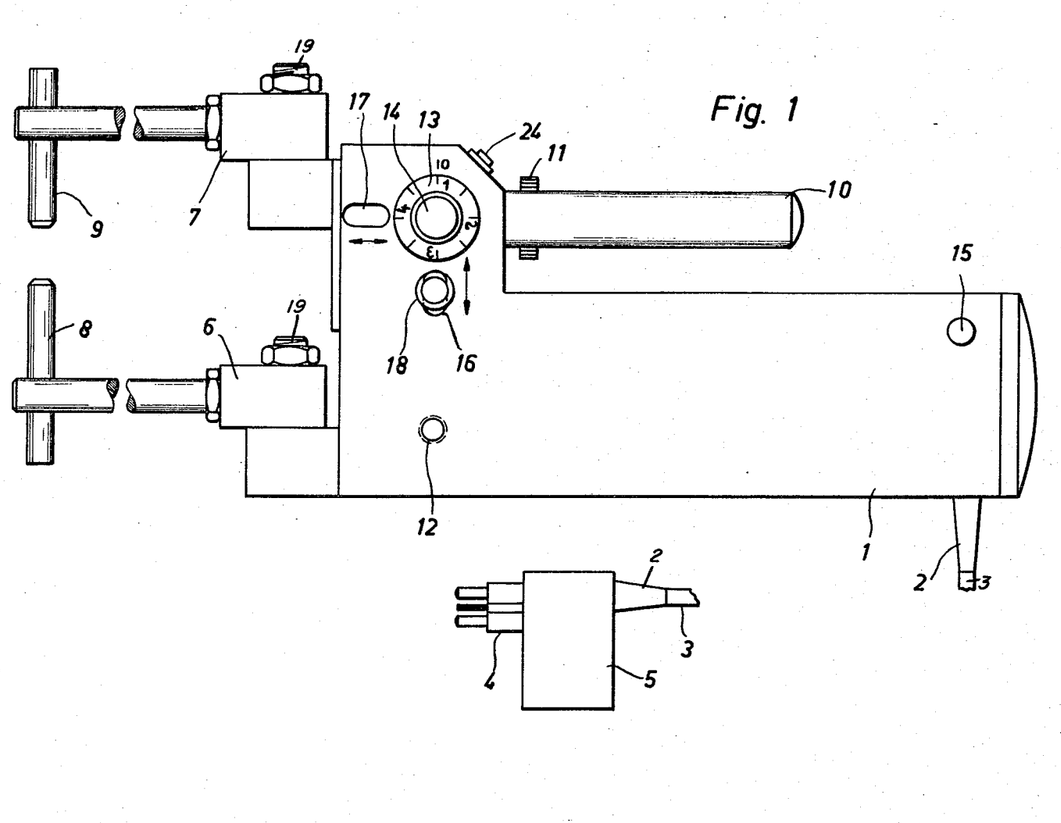
FIGURE 1 is a side elevation of an electric hand-operated spot welder according to the invention in the operative position for a vertical movement of the electrode holder.

As illustrated in FIGURE 1, the electric hand-operated spot welder according to the invention comprises a housing 1 which is preferably made of an insulating material such as plastic or the like but may also consist of sheet metal, in which case it is to be insulated from the elements contained therein. Housing 1 is provided with a cable lead 2 for a cable 3 the end of which carries a connecting plug 4. Near the plug 4 a contactor 5 is provided.

The spot welder further comprises two electrode holders 6 and 7 which carry the electrodes 8 and 9. The electrode holder 6 is rigidly secured to the housing 1, while the other electrode holder 7 is movable relative to the housing.

Above its main body, the housing 1 carries a handle 10 which may also serve as an oil container. Next to this handle, there is a setting wheel 11 for adjusting the pressure of the electrodes. Housing 1 may be further provided with a lateral bore 12 into which another handle, not shown, may be screwed. For adjusting the welding period, there is also on the outside of the housing 1 a time-setting disk 13 which may be locked by a setscrew 14.

The pivot axis of the movable electrode holder is located near the end of the housing opposite to that facing the electrodes and it is formed by a bolt 15 about which the movable electrode holder arm may swing up and down.

Figure 2:
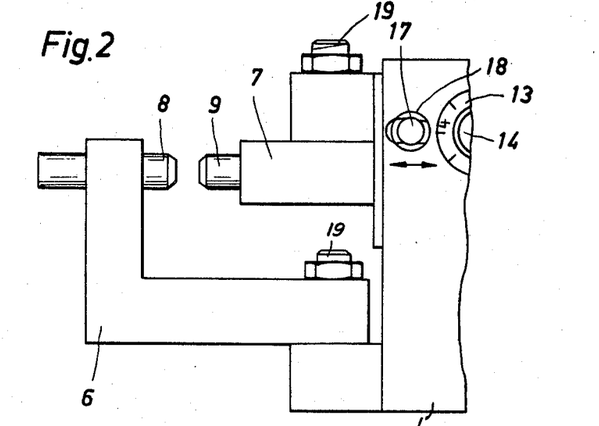
FIGURE 2 is a fragmentary side elevation of the apparatus in the operative position for a horizontal movement of the electrode holder.

The wall of the housing 1 is further provided with two slot-shaped holes 16 and 17 into either of which a bolt 18 may be inserted depending upon the desired direction of movement of the movable electrode holder. In FIGURES 1, 4, 5 and 6, in which the electrode holder 7 is swingable in the vertical direction, bolt 18 is located in the hole 16, while in FIGURE 2 in which the electrode holder 7 is movable in the horizontal direction, bolt 18 is inserted into the hole 17.

Figure 3:
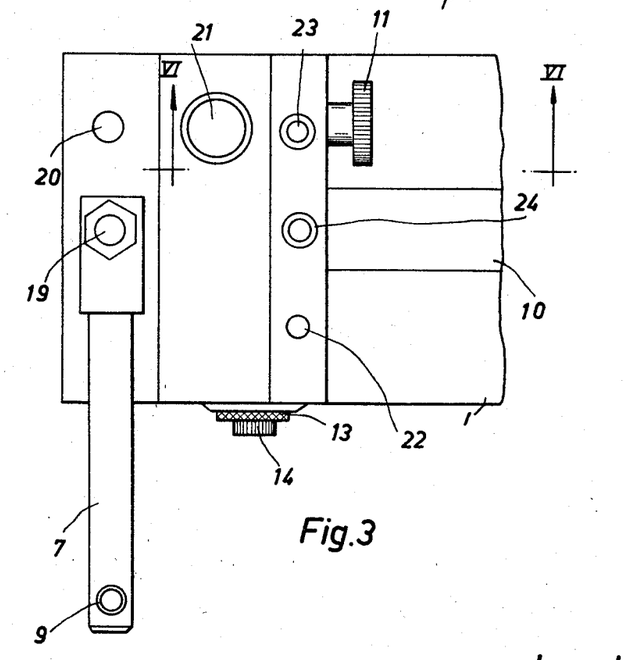
FIGURE 3 is a fragmentary plan of the apparatus of FIGURE 1 with the electrode holder in an outwardly swiveled position.

The top view according to FIGURE 3 shows that the electrode holders 6 and 7 may be swiveled in the desired direction about the bolts 19. By providing several bores 20, the front part of the electrode holder 7 or 6 may be inserted in different positions so as to permit the distance between the housing 1 and the respective electrode to be changed.

FIGURE 3 further shows that the apparatus is provided with a pressure gauge 21, a signal lamp 22, and a shutoff valve 24.

Figure 4:
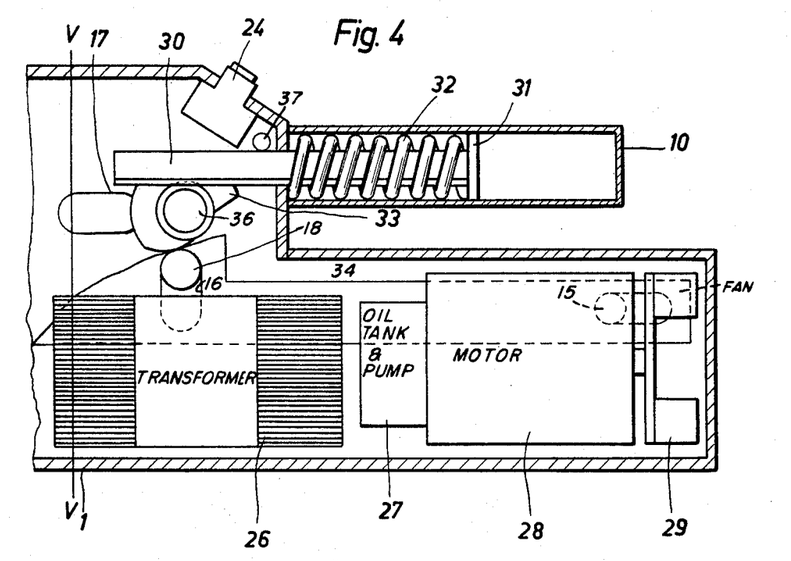
FIGURE 4 is a fragmentary longitudinal section through the apparatus.
Figure 5:
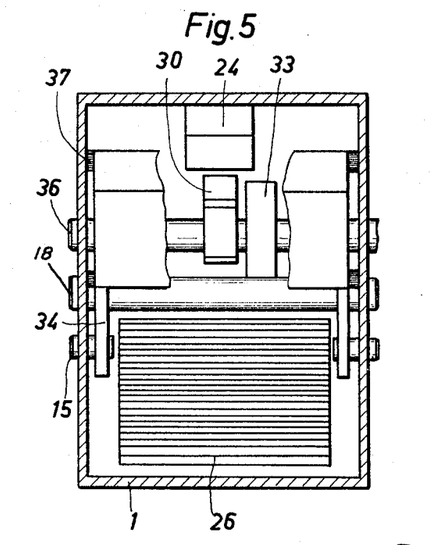
FIGURE 5 is a cross section taken along line V—V of FIGURE 4 with parts broken away.

The internal structure of the apparatus is illustrated in FIGURES 4 and 5 which show that the housing 1 contains a transformer 26, an oil tank 27 which is equipped with a pump and an overflow valve, a motor 28, and a ventilating fan 29 in an easily accessible arrangement one behind the other.

The transformer cores are preferably mounted in the housing wall without apertures in their stacks of laminations by means of recesses, blocks, spacing elements, keys, or the like of any suitable material. They may consist of two E-shaped half stacks which are fitted over the transformer coils. This is an advantage over the conventional lamination stacks which it is difficult to mount or remove for repairs since the laminations must be individually inserted or withdrawn.

Handle 10 forms a hydraulic cylinder and contains a rack 30 which is connected at one end to a piston 31 slidable back and forth in the cylinder 10 and surrounded by one or more return springs 32 which are likewise located within the handle. Rack 30 engages a gear mounted on shaft 36 which also carries a cam plate 33. Rotation of this cam plate 33 moves the movable electrode-holder arm 34 either in a vertical or horizontal direction depending upon whether the bolt 18 is inserted into the bore 16 or the bore 17.

FIGURE 5 illustrates the internal structure of the apparatus still more clearly. It shows that the electrode-holder arms 34 are mounted in the housing on the bolt 15 and that they are connected by bolt 18 in slots 16 or slots 17 for movement relative to the housing either in the vertical or the horizontal direction by means of the cam plate 33 secured to a shaft 36 which is rotatably mounted in the housing but not movable in the vertical or horizontal direction. This shaft 36 is driven by a rack 30 when the piston 31 reciprocates in the hydraulic cylinder 10. For a better rack-guiding action, hardened guide rods 37 are provided.

The structural details of the electrode-holder arms 34 are illustrated in FIGURE 6 which again shows the bolt 15. The electrode-holder arms 34 are swingable upwardly about the axis of this bolt 15, whereby the electrode will be moved in the vertical direction. Arms 34 may, however, also slide horizontally relative to bolt 15 when the electrode should be moved in the horizontal direction as is required for the electrode arrangement shown in FIGURE 2.

As stated above, the cam plate 33 operates to swing the electrode-holder arms downward by pressure on bolt 18 for moving the upper electrode holder 6 downward in the case of an electrode arrangement such as shown in FIGURE 1. Spring return mechanism is provided for moving the electrode-holder arms upward when the cam plate 33 has been turned to release bolt 18 at the end of the welding operation. Correspondingly, when the bolt 18 is inserted in the electrode-holder arms to extend through slot 17 so that the cam plate will move the electrode holder 6 outwardly for the electrode holder arrangement shown in FIGURE 2, it is necessary to have spring return mechanism to move the electrode holder 6 to the right as seen in FIGURE 4 when the cam plate 33 has released the bolt.

Figure 6:
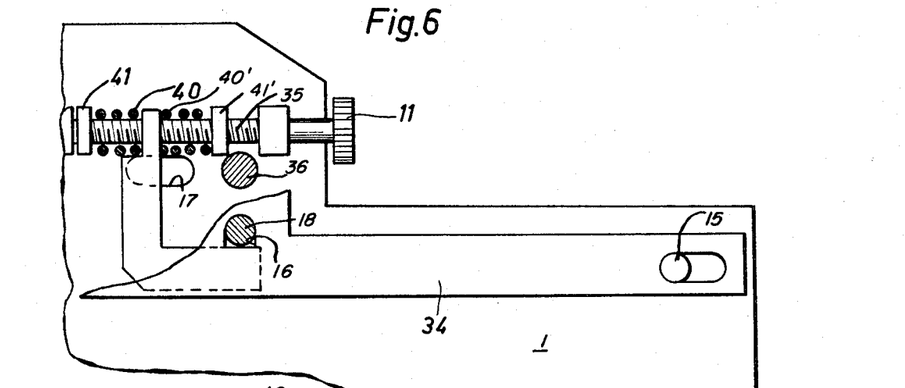
FIGURE 6 is a section on line VI—VI of FIGURE 3 showing spring return mechanism for the movable electrode-holder arm according to FIGURES 4 and 5.

Spring return mechanism capable of effecting both types of return movement for the electrode-holder arm 34 is shown in FIGURE 6. The knee of a bell crank 38 is mounted on housing 1 by a pivot 39. The upright arm of such bell crank is engaged between compression springs 40 and 40′ encircling screw 35. The initial stress of such springs is adjustable by turning the setting wheel 11 which rotates screw 35 to move nuts 41 and 41′ relative to the upright arm of bell crank 28. When bolt 18 is in slots 16 and the electrodes are in the position of FIGURE 1, the horizontal arm of the bell crank extends beneath and bears on the lower side of bolt 18 extending through the electrode-holder arms. Spring 40′ bearing on nut 41′ tends to swing the bell crank in a direction to raise its lower arm for holding bolt 18 and the electrode-holder arms in the upper position shown in FIGURE 6. When the cam plate 33 is rotated to press bolt 18 downward, the horizontal arm of bell crank 38 is swung downward which swings its upper end in a direction to compress spring 41′ farther. When rotation of the cam releases bolt 18, spring 40′ will expand to swing the upright arm of the bell crank to the left and swing the horizontal arm upward to raise bolt 18 and the electrode-holder arms again.

When the bolt 18 has been inserted through the electrode-holder arms 34 to pass through the horizontally elongated slots 17 in the housing, such bolt will be at the right side of the upright arm of bell crank 38 as seen in FIGURE 6. If the cam plate 33 is now rotated to press bolt 18 to the left along slots 17, such bolt will engage the upright arm of the bell crank and swing it to the left as seen in FIGURE 6 to compress spring 40 between such bell crank arm and the nut 41. When the cam has been rotated to a position to release bolt 18 again, spring 40 will expand to swing the upright bell crank arm in a clockwise direction as seen in FIGURE 6. Engagement of such arm with bolt 18 will move this bolt to the right and slide the electrode-holder arms 34 to the right for separating the electrodes 6 and 7 when in the position of FIGURE 2.

Figure 7:
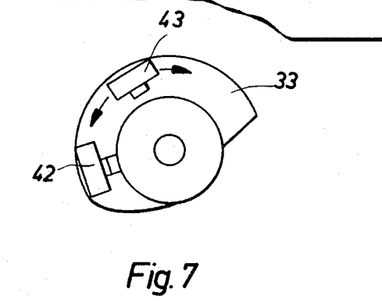
FIGURE 7 is an elevation of a cam plate.

FIGURE 7 shows the cam plate 33 which cooperates with two stops for the switches 42 and 43 for switching the welding current either on or off. The welding current may, however, also be controlled independently of the cam plate 33. It is advisable to make at least one of the stops for the switches adjustable so as to permit the welding period to be regulated.

Figures 9, 10, 11, 12:
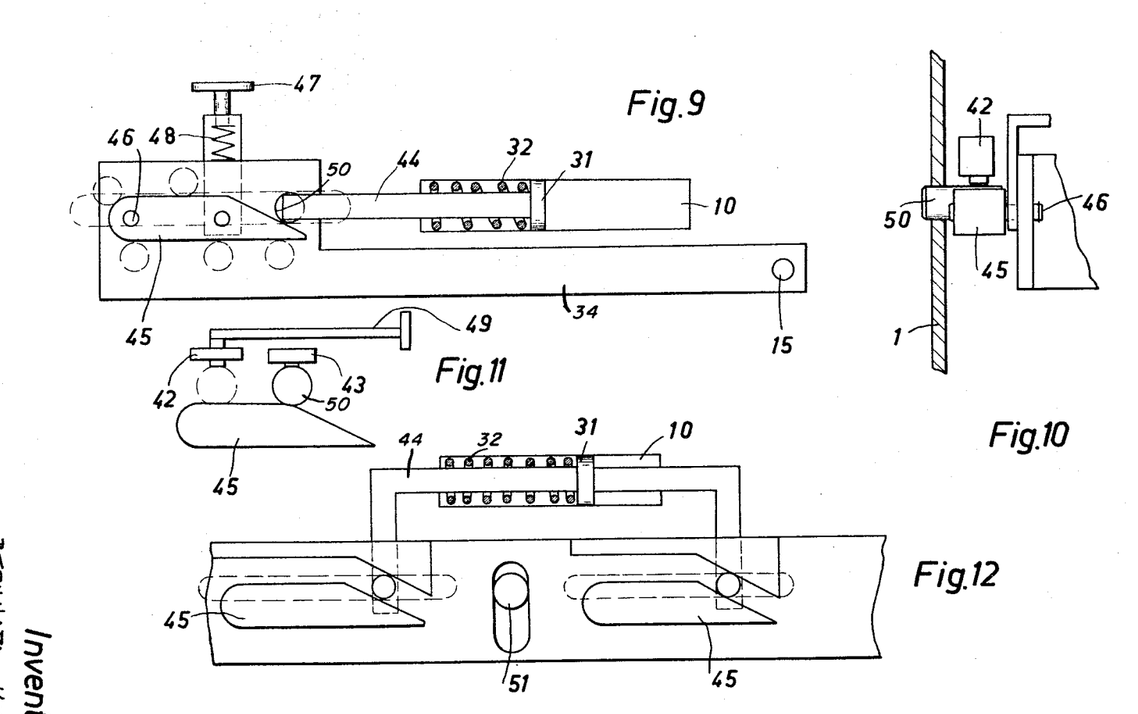
FIGURE 9 is a side elevation of a modification of the movable electrode-holder arm.
FIGURE 10 is an end elevation of the movable electrode-holder arm according to FIGURE 9.
FIGURE 11 is a side elevation of the wedge-shaped lever for the actuation of control switches.
FIGURE 12 is a side elevation of another modification of means for insuring a parallel motion of the movable electrode holder.

A modification of the apparatus as previously described is illustrated in FIGURES 9, 10, and 11. While the housing as well as the transformer, the pump, the motor and the ventilator are of the same design as previously described, the rack and the cam plate are replaced by a piston rod 44 which is again slidable back and forth in the handle 10 in the form of a hydraulic cylinder and is acted upon by a retracting spring 32. The front end of piston rod 44 is adapted to act upon a wedge-shaped lever 45. Such lever is mounted on electrode-holder arm 34 by a pivot 46 located adjacent to the lever end remote from piston rod 44. The other end portion of the lever is supported by the shaft of a pressure setting wheel 47 having a compression spring 48. The adjustment of wheel 47 will raise or lower the inclined end of wedge 45 relative to the line of action of piston rod 44. When the rod is moved to the left in FIGURE 9, it will progressively press down the wedge-shaped lever 45 and thereby move arm 34 downward through pivot 46. This spot welder which is only adapted for a vertical movement of the electrode is likewise provided with a pair of switches 42 and 43 which are adjustable for varying the welding period by means of a threaded spindle 49. These embodiments of the invention have the advantage that at the end of the welding operation the movable electrode is automatically lifted from the fixed electrode.

FIGURE 10 which is a front view of the means as shown in FIGURE 9 illustrates that at the front end of the piston rod 44 a roller 50 is provided which is movable in a slot in the housing 1 and is located closely adjacent to the wedge-shaped lever 45 for guiding the piston rod and actuating switches 42 and 43. As the piston rod 44 reaches its extreme left position as seen in FIGURE 9 and is reversed to move to the right, roller 50 will travel around the arcuate left end of wedge 45 to the underside of such wedge. As the piston rod continues movement to the right, roller 50 will positively lift wedge 45 and arm 34.

FIGURE 12 illustrates a modification of the spot welder according to FIGURE 9, in which both the front and rear ends of the electrode-holder arm are acted upon by a piston rod and a wedge-shaped lever. This has the advantage that the movable electrode will not carry out a pivoting movement but will be moved exactly parallel to the fixed electrode. A single guide bolt 51 is adapted to support this entire mechanism. The two piston rods may in this case be operated by a common piston.

Figures 13, 14:
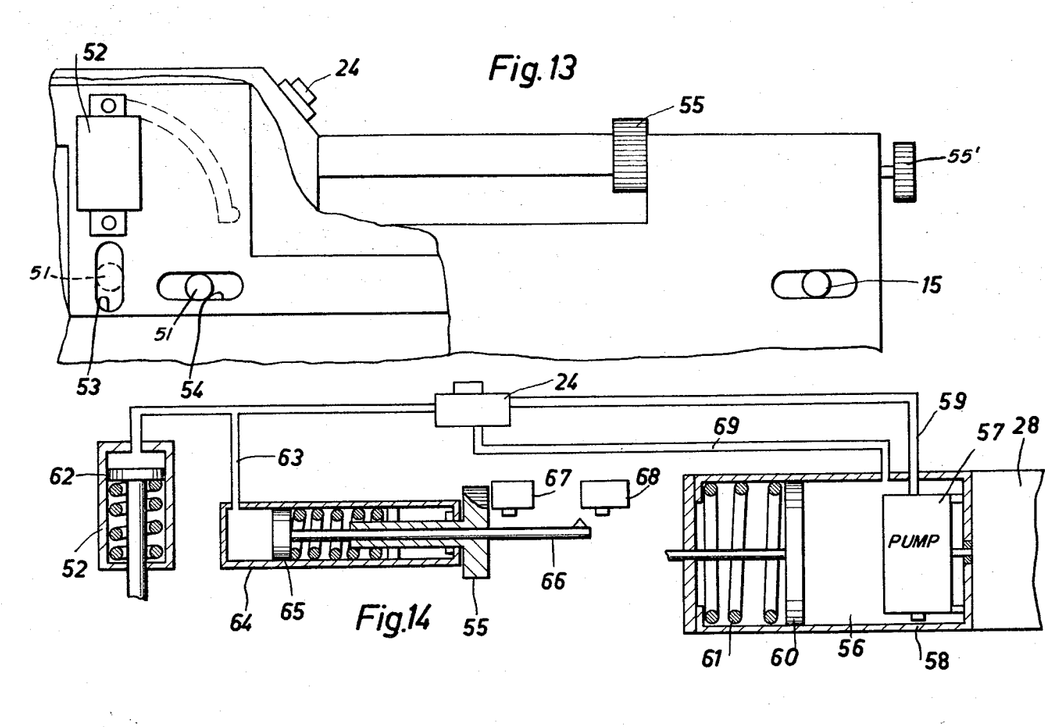
FIGURE 13 is a side elevation of another modification of the spot welder according to the invention with parts broken away.
FIGURE 14 is a diagrammatic illustration of the pressure-fluid system.

In a further modification of the spot welder according to the invention is illustrated in FIGURE 13, the cam plate or the wedge-shaped lever is replaced by a fluid-pressure piston and cylinder 52 which itself is pivotable and may therefore effect either a horizontal or vertical movement of the movable electrode-holder arm. Depending upon which kind of movement is to be carried out, the bolt 51 is inserted into one or the other of the holes 53 and 54. The adjusting screws for adjusting the electrode pressure and the welding period are indicated at 55 and 55′, respectively.

FIGURE 14 is a diagrammatic illustration of the hydraulic system for the apparatus according to FIGURE 13. The hydraulic fluid is contained in the oil tank 56 which together with the motor 28 is mounted in the housing 1, not shown. In the oil tank 56 itself a pump 57 is mounted which has an intake opening 58 and an output line 59. The oil tank 56 further contains a pressure piston 60 which is acted upon by a spring 61 and is movable back and forth within the oil tank. This piston 60 continually urged to the right by spring 61 insure that pressure fluid will always pass to the intake opening 58 of pump 57 regardless of the attitude or position of the spot welder.

Figure 8:
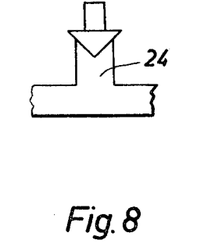
FIGURE 8 is a diagrammatic illustration of the shut-off valve.

The pressure fluid passes from the output line 59 through the valve 24, which is shown diagrammatically in FIGURE 8, to the pressure cylinder 52 which is illustrated for a vertical movement in accordance with its position as shown in FIGURE 13. This pressure cylinder 52 contains a spring-loaded piston 62.

A further line 63 leads to a second pressure cylinder 64 in which likewise a spring-loaded piston 65 is slidable which serves as a pressure balance when the electrodes are applied upon a workpiece. This piston 65 is connected to a piston rod 66 which is adapted to act upon the switches 67 and 68. The adjusting screw 55 may be turned for adjusting the desired electrode pressure. Line 69 serves for returning the oil from valve 24 to the oil tank 56.

The mode of operation of the spot welder according to FIGURES 1 to 7 is as follows:

After the motor 28 has been switched on by the actuation of the pushbutton switch 23 (FIGURE 3) pump 27 conveys the pressure fluid into the hydraulic cylinder 10 and thereby moves to the left piston 31 and the rack 30 which is connected thereto. This movement of rack 30 drives the gear on shaft 36 meshing with it which thereby turns the cam plate 33. Cam plate 33, in turn, presses upon the slidable bolt 18 so that the electrode-holder arms 34 which are secured thereto are also moved correspondingly.

This movement will be in the horizontal direction if the bolt 18 is inserted into the hole 17, in which case the electrode-holder arms 34 have horizontally elongated slots at their rear ends receiving the bolt 15 and, therefore, are slidable relative to the such bolt. If the bolt 18 is, however, inserted into the vertically elongated slot 16, the electrode-holder arms 34 will be swung downward about bolt 15 as an axis so that the electrode holder 7 and the electrode 9 may be moved up and down substantially in a vertical direction.

When the motor 28 is started, the cooling fan 29 is also operated, or it may run independently of the movement of the electrode holder 7. Such fan blows the cooling air past the transformer 26 and up to the electrodes 8 and 9 and thereby cools the latter.

Since it is important that the welding current will be switched on only when the two electrodes are firmly pressed against opposite sides of the workpiece so that no undesirable premature flow of current will occur, suitable switch stops are provided which are adjustable so as to insure that a welding current not flow until the movable electrode holder is in the proper position. The spacing of the switches, such as 42 and 43 in FIGURE 7, may be adjusted in accordance with the desired welding period.

It is further of importance that the electrodes be pressed with predetermined pressure against the workpiece and that once adjusted this pressure remain the same. This pressure should be variable in accordance with the material to be welded. For this purpose the angular arm 38 is provided, as shown in FIGURE 6. When the electrode-holder arm 34 pivots about the bolt 15, the front end of this arm 38 presses against the right part of spring 40 so that the pivoting movement can continue only until it is stopped by the increasing spring pressure of spring 40. During a horizontal movement of the electrode-holder arm 34, the angular arm 38 presses against the left half of spring 40 which thereby also limits the extent of the movement of the electrode-holder arm in accordance with the tension to which this spring is adjusted.

In place of the hydraulic transmission from the motor to the cam plate, it would, of course, also be possible to employ a purely mechanical transmission by providing an intermediate gear and a flexible shaft or suitable connecting rods. The required functions for opening the electrode holder may then be carried out in a similar manner.

In the modifications of the spot welder as illustrated in FIGURES 9 to 12, the pressure fluid is likewise conducted from the pump to the fluid-pressure cylinder 10, whereby the piston 31 and the piston rod 44 thereon are moved in the axial direction toward the left of FIGURES 9 and 12 against the action of the return spring 32 which, when the pressure decreases, returns the piston to its original position. Instead of providing the motor within the housing, the driving force may, of course, also be provided by a separate motor and be transmitted to the spot welder by a flexible shaft.

The roller 50 carried by the end of piston rod 44 then presses against the inclined surface of the wedge-shaped lever 45 and thereby swings the electrode arms 34 downwardly. The switches 42 and 43 in FIGURE 11 will be actuated by engagement of roller 50 with them to switch the welding current on and off in a manner similar to actuation of switches 42 and 43 by the cam plate in the embodiment according to FIGURE 7. After the roller 50 on the front end of piston rod 44 has passed over the wedge-shaped arm 45, the latter is again lifted and the piston rod may again be retracted by spring 32 to its original position. This has the result, that the movable electrode holder will again be lifted off the fixed electrode holder.

In those embodiments of the invention in which the movement of the movable electrode holder is carried out by means of a hydraulic mechanism, it is also possible to replace the electrode holders by stamping or other tools. This permits the same apparatus to be employed, for example, in a first operation to carry out the necessary stamping steps for hump welds which are then produced with the same apparatus in a second operation.

The electric hand-operated spot welder according to FIGURES 15 to 21 consists primarily of a housing 101 in which the electric and hydraulic means, such as the transformer, the hydraulic pump, etc. are mounted, and of the work head 102.

The work head 102 forms a hydraulic cylinder 103 in which a piston 104 is slidable upwardly and downwardly and it is pivotally mounted between a pair of arms 105 which are connected to the housing 101.

Figures 19, 21:
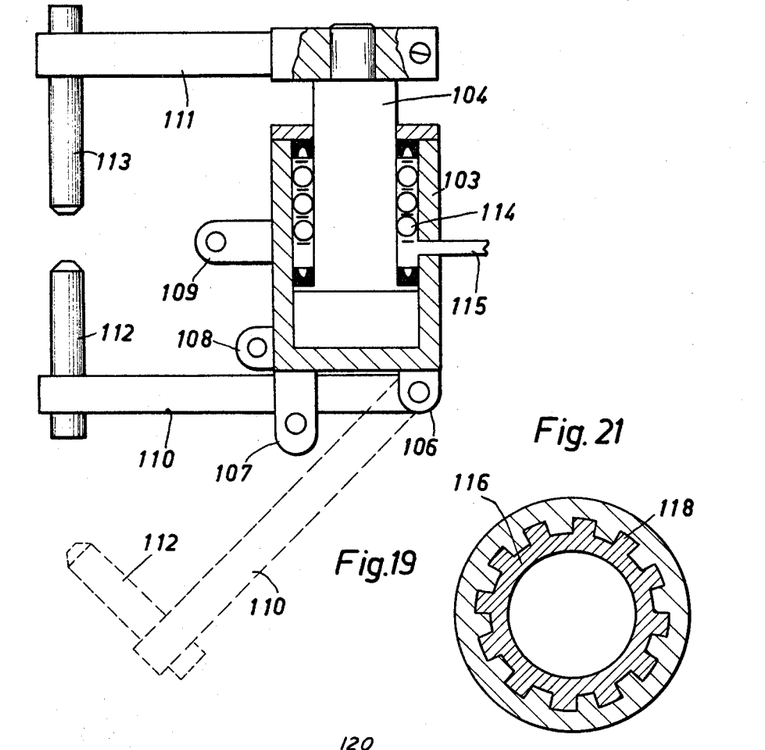
FIGURE 19 is a side elevation of a work head similar to that shown in FIGURE 16 with parts broken away and parts in section.
FIGURE 21 is a cross section through the contact sleeve of FIGURE 20.

The hydraulic cylinder 103 is provided on two outer walls at right angles to each other with lugs 106, 107 on one wall and 108, 109 on the other wall, as shown in FIGURE 19, for mounting an electrode-holder arm 110 thereon. The second electrode-holder arm 111 is mounted on the free end of piston 104. Both arms 110 and 111 carry electrodes 112 and 113, respectively, on their ends.

The electrode-holder arm 110 is pivotable about a bolt which is inserted through the eye of the lug 106 or 108. This arm 110 may therefore be pivoted away from its operative position, as indicated in FIGURE 19 in dotted lines, which facilitates considerably the insertion of a workpiece between the electrodes. In its operative position, the electrode-holder arm 110 is locked by a bolt in the eye of lug 107 or 109.

Figure 17:
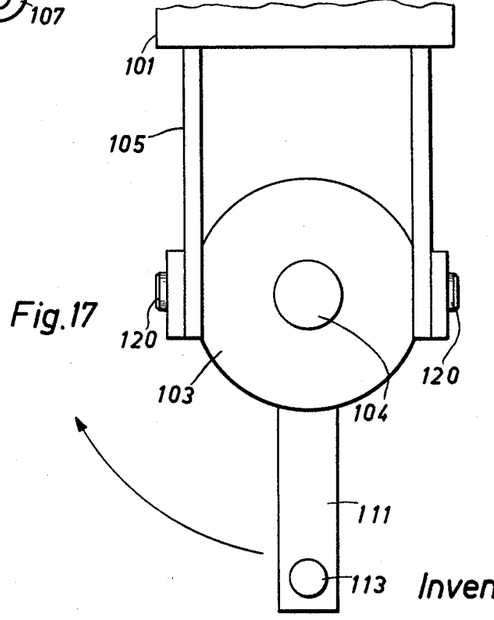
FIGURE 17 is a plan of the work head shown in FIGURE 16.
Figure 18:
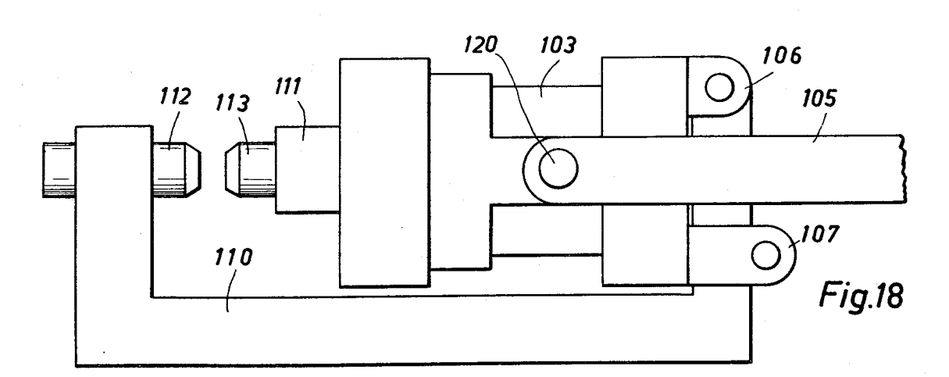
FIGURE 18 is a side elevation of the same work head but with the hydraulic cylinder and piston unit turned through an angle of 90° from the position of FIGURE 16 and with modified electrode holders.

The electrode-holder arms 110 and 111 are also swingable about the axis of the hydraulic cylinder 103, as indicated in FIGURE 17, so as also to permit lateral working with the spot welder. Furthermore, the electrode-holder arms are removable so that the apparatus requires less space in shipment and in order to permit the position of the arms to be changed or other arms of a different shape to be inserted. Thus, for example, it may be seen in FIGURES 15 and 16 that the arms 110 and 111 are disposed perpendicular to the axis of hydraulic cylinder 103 with arm 110 connected to the lower cylinder end and arm 111 mounted on the upper end of piston 104, while in FIGURE 18 the electrode-holder arm 111 is in axial alignment with the piston 104. It is also possible to place the hydraulic cylinder in such a position that the piston will carry out a stroke so as to press the electrode-holder arms away from each other, while when the cylinder is turned about an angle of 180°, the stroke of the piston will press the electrode-holder arms toward each other.

As illustrated in FIGURE 19, a ball bearing cage 114 containing a plurality of balls is inserted into the hydraulic cylinder to improve the sliding movement of the piston 104 and to increase the stability of the entire apparatus. Of course, in place of such balls it is also possible to use other suitable guiding or bearing elements which will then be lubricated by the pressure fluid which may act upon both sides of the piston. FIGURE 19 also indicates the inlet 115 for the hydraulic fluid which is preferably located within the swivel axis 120 shown in FIGURE 16 of the hydraulic cylinder 103.

Figure 20:
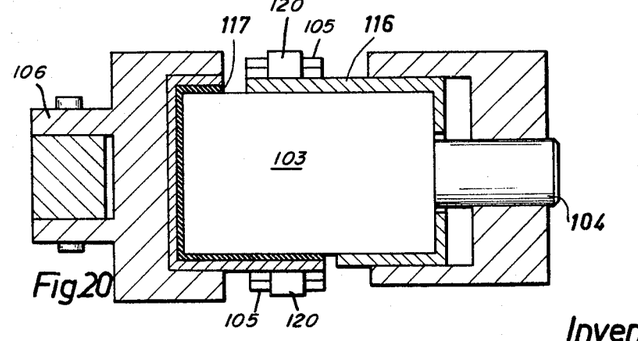
FIGURE 20 is a longitudinal section of a work head and contact sleeve having features different from those of the work head shown in FIGURE 19.

As further shown in FIGURE 20, the piston 104 may also be surrounded by a contact-making sleeve 116 of a suitable conductive material in a manner so as to insure that the current will be properly transmitted even during rotary and sliding movements of the piston. At the other side of the piston, an insulating layer 117 is provided.

The outer wall of this contact-making sleeve 116 may be provided with projections 118, as shown in FIGURE 21, which permit the piston end on which the electrode arm 11 is mounted to be turned relative to sleeve 16 and to be locked in different positions so that the electrode-holder arm 111 which is secured to the piston end may also be swung to different positions as indicated by the arrow in FIGURE 17. Electrode arm 110 can be adjustably swung in a similar manner.

The current supply line which is inserted into the hydraulic cylinder at the swivel point thereof is preferably covered up toward the outside by suitable covering means. It is, however, also possible to employ the connecting bars 105 of the hydraulic cylinder as such covering means.

Figure 15:
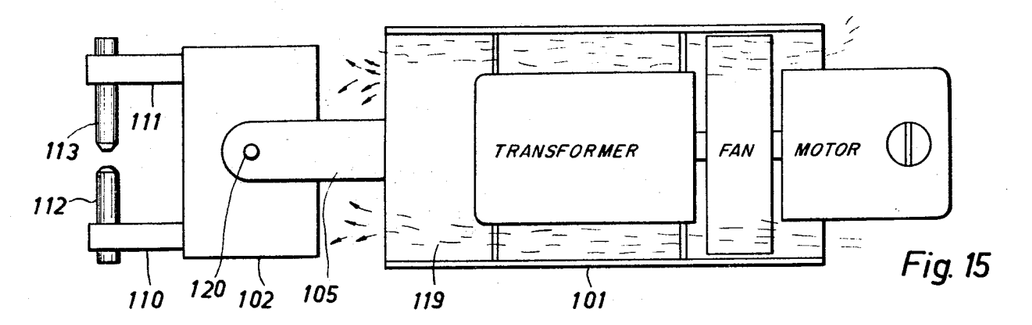
FIGURE 15 is a diagrammatic illustration of another modification of the hand-operated spot-welder according to the invention.
Figure 16:
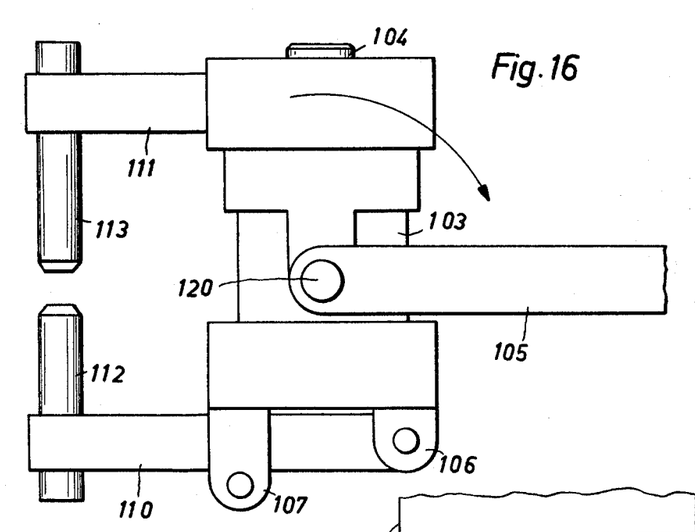
FIGURE 16 is an enlarged side elevation of the work head of the apparatus according to FIGURE 15 provided with electrode arms movable relative to each other.

As illustrated in FIGURE 15, it has been found to be very advantageous to design the housing of the apparatus so as to form an air channel 119 through which an air current is conducted past the transformer to the work head 102. In this manner not only the transformer but also the electrodes on the work head 102 will be cooled. In addition, the hydraulic cylinder may also be provided with cooling ribs along and between which the air current will flow so as to reduce the temperature of the oil in the hydraulic system. This supply of cooling air may be further increased by providing an additional ventilator in the housing of the apparatus or by supplying it from the outside. It is also possible to provide either the piston or the cylinder or both with channels for passing a cooling fluid therethrough. This cooling fluid may then be supplied to a cooling jacket which is provided around the cylinder. It may, however, also be inserted into cooling lines which are provided in the piston.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. An electric hand-operated spot welder comprising a housing, a pair of electrode holders supported from said housing and carrying electrodes, at least one of said electrode holders being movable relative to the other, means for moving said movable electrode holder including a hydraulic liquid reservoir in said housing, a pump in said housing connected to said reservoir, an electric motor in said housing connected to drive said pump, a hydraulic piston and cylinder connected to receive liquid under pressure from said pump and operatively connected to move said movable electrode holder, and a transformer in said housing electrically connected to said electrode holders, said transformer and said electric motor being mounted in said housing independently of each other for independent removal from said housing.

2. The welder defined in claim 1, and a spring-loaded pressure piston in the hydraulic reservoir urged toward the connection of the pump to the reservoir for moving liquid in the reservoir toward the pump connection regardless of the quantity of liquid in the reservoir and the location of the connection to the pump relative to the bottom of the reservoir.

3. The welder defined in claim 1, and a cooling fan driven by the electric motor and located to blow cooling air over the motor and the transformer.

4. The welder defined in claim 3, and duct means communicating with the cooling fan and directed toward the electrodes carried by the electrode holders for projecting cooling air through said duct means toward the electrodes.

5. The welder defined in claim 3, and duct means communicating with the cooling fan and directed toward the piston and cylinder for projecting cooling air through said duct means toward the piston and cylinder.

6. The welder defined in claim 5, in which the duct means are also directed toward the electrodes carried by the eelctrode holders for projecting cooling air through the duct means toward the electrodes.

7. The welder defined in claim 1, in which the pair of electrode holders include a pair of generally parallel arms carrying elongated electrodes for disposition of the electrodes substantially in alignment with each other, means guiding one of said arms for movement generally lengthwise of its electrode relative to the other arm, and means mounting said arms for displacement transversely of the lengths of the electrodes.

8. The welder defined in claim 1, including elongated movable electrode-holder arm means carrying an electrode, means guiding said arm means for movement lengthwise thereof, means guiding said arm means for movement transversely of its length, and drive means connected to said arm means for effecting movement thereof selectively lengthwise of said arm means and transversely of said arm means.

9. The welder defined in claim 8, in which the drive means includes a rotative cam plate engageable with the arm means for effecting movement thereof and rotatable by the hydraulic piston and cylinder means, and switch means actuated by rotation of said cam plate for effecting a supply of welding current from the transformer to the electrode holders.

10. The welder defined in claim 8, in which the means guiding the electrode-holder arm means for movement transversely of its length includes pivot means connecting a portion of the electrode-holder arm means remote from the eletcrode carried thereby and the housing for swinging movement of the electrode-holder arm means transversely of its length relative to the housing.

11. An electric spot welder comprising a pair of electrode holders carrying electrodes, at least one of said electrode holders being movable relative to the other, means for moving said movable electrode holder including a hydraulic liquid reservoir, a pump connected to said reservoir, an electric motor connected to drive said pump and a hydraulic piston and cylinder connected to receive liquid under pressure from said pump and operatively connected to move said movable electrode holder, a cooling fan driven by said electric motor, and duct means communicating with said cooling fan and directed toward said electrodes carried by said electrode holders for projecting cooling air through said duct means toward said electrodes.

12. An electric spot welder comprising a pair of electrode holders carrying electrodes, at least one of said electrode holders being movable relative to the other, means for moving said movable electrode holder including a hydraulic liquid reservoir, a pump connected to said reservoir, an electric motor connected to drive said pump and a hydraulic piston and cylinder connected to receive liquid under pressure from said pump and operatively connected to move said movable electrode holder, a cooling fan driven by said electric motor, and duct means communicating with said cooling fan and directed toward said hydraulic piston and cylinder for projecting cooling air through said duct means toward said hydraulic piston and cylinder.

13. An electric spot welder comprising a pair of electrode holders including a pair of substantially parallel arms, elongated electrodes carried by said arms in positions with their lengths extending transversely of the lengths of said arms, and a hydraulic piston and cylinder connecting said arms and located with its axis disposed substantially perpendicular to the lengths of said arms and substantially parallel to the lengths of said electrodes for effecting approach movement of said arms to bring said electrodes into cooperative relationship.

14. The welder defined in claim 13, in which the arms are mounted on the hydraulic piston and cylinder, and means supporting the hydraulic piston and cylinder and guiding the piston and cylinder for swinging of its axis and of the arms carried thereby relative to said supporting means.

15. The welder defined in claim 13, and means supporting one of the electrode-holder arms from the hydraulic piston and cylinder for swinging relative to the hydraulic piston and cylinder.

16. The welder defined in claim 13, means supporting a first one of the electrode-holder arms from the piston and cylinder in a predetermined position relative to the hydraulic piston and cylinder, pivot means supporting the other of the electrode holder arms for swinging between an operative position substantially parallel to the first arm and an inoperative position swung away from the first arm, and means for securing such other arm in such operative position.

17. The welder defined in claim 13, including two supports for the hydraulic piston and cylinder, a first one of the electrode-holder arms being carried by the piston of the piston and cylinder and in electricity-conducting relationship thereto, an electrically-conductive sleeve electrically connected to one of said supports and slidably engageable by the piston of the piston and cylinder, means connecting the other of said supports to the second electrode-holder arm, and insulating means interposed between the piston and cylinder and such other support and such other electrode-holder arm.

18. The welder defined in claim 17, including mounting means for the first electrode-holder arm, said mounting means and the electrically-conductive sleeve having interfitting projections and recesses for restraining relative rotation of said mounting means and the electrically-conductive sleeve.

References Cited

UNITED STATES PATENTS

| | | | |
|---|---|---|---|
| 1,153,384 | 9/1915 | Heany | 219—89 |
| 2,318,023 | 5/1943 | Strickland | 219—89 |
| 2,413,783 | 1/1947 | Purat | 219—89 |
| 2,689,295 | 9/1954 | Goldner | 219—89 |
| 2,749,417 | 6/1956 | Griskell | 219—90 |
| 2,785,282 | 3/1957 | Brennen et al. | 219—89 |
| 2,832,882 | 4/1958 | Bieri | 219—89 |
| 2,860,231 | 11/1958 | Stone | 219—89 |
| 3,008,034 | 11/1961 | Wolfbauer | 219—89 |

FOREIGN PATENTS 532,648  1/1941  Great Britain.

RICHARD M. WOOD, *Primary Examiner.*

W. D. BROOKS, *Assistant Examiner.*